(12) United States Patent
Kanamitsu

(10) Patent No.: US 10,433,409 B1
(45) Date of Patent: Oct. 1, 2019

(54) MEMBER FOR REDUCING CHARGE FOR TRANSPORTATION AND TRANSPORTATION PROVIDED WITH THE SAME BACK GROUND

(71) Applicant: Landmaster Co., Ltd., Yokohama-shi (JP)

(72) Inventor: Toshihisa Kanamitsu, Yokohama (JP)

(73) Assignee: LANDMASTER CO., LTD., Yokohama-Shi (JP)

( * ) Notice: Subject to any disclaimer, the term of this patent is extended or adjusted under 35 U.S.C. 154(b) by 0 days.

(21) Appl. No.: 16/099,481

(22) PCT Filed: Dec. 7, 2017

(86) PCT No.: PCT/JP2017/043951
§ 371 (c)(1),
(2) Date: Nov. 7, 2018

(87) PCT Pub. No.: WO2018/116843
PCT Pub. Date: Jun. 28, 2018

(30) Foreign Application Priority Data

Dec. 19, 2016 (JP) .................. 2016-245991
Jan. 20, 2017 (JP) .................. 2017-008447

(51) Int. Cl.
*H05F 3/06* (2006.01)
*B60R 16/06* (2006.01)

(52) U.S. Cl.
CPC .............. *H05F 3/06* (2013.01); *B60R 16/06* (2013.01)

(58) Field of Classification Search
USPC ........................... 361/216, 217, 231
See application file for complete search history.

(56) References Cited

U.S. PATENT DOCUMENTS

| 3,974,322 A | 8/1976 | Drabkina et al. |
| 6,653,646 B1 | 11/2003 | Shibata |
| 7,612,352 B2 * | 11/2009 | Iizuka .............. G21G 4/04 123/539 |

(Continued)

FOREIGN PATENT DOCUMENTS

| CN | 2894196 | 4/2007 |
| CN | 103763845 | 4/2014 |

(Continued)

*Primary Examiner* — Ronald W Leja
(74) *Attorney, Agent, or Firm* — Lex IP Meister, PLLC

(57) ABSTRACT

The present invention is to provide a member for reducing charge for transportation that further decreases positive charge of charged transportation to contribute to improvement in driving stability and acceleration performance. The member for reducing charge for transportation 1 of the present invention is a laminated structure in which a metal layer 11 and a radiation generating layer 12 are laminated. The metal layer 11 contains a metal with a redox potential of 0 V or less or an alloy of a metal with a redox potential of 0 V or less, and the radiation generating layer 12 contains a mixture of a natural ore containing a radioactive substance with a radiolucent resin. The dose of radiation generated from the radiation generating layer 12 is from 0.02 μSv/h or more to 0.2 μSv/h or less. The member 1 is suitably used for the transportation in which the body is positively charged by static electricity caused by travelling, cruising, etc.

4 Claims, 1 Drawing Sheet

(56) References Cited

U.S. PATENT DOCUMENTS

| | | | |
|---|---|---|---|
| 10,336,270 B2* | 7/2019 | Yamada | B62D 35/00 |
| 2004/0238802 A1 | 12/2004 | Inoue | |
| 2012/0039012 A1 | 2/2012 | Nakai | |
| 2016/0264192 A1 | 9/2016 | Tanahashi et al. | |
| 2016/0280162 A1 | 9/2016 | Yamada et al. | |
| 2019/0219007 A1* | 7/2019 | Kanamitsu | F02M 27/065 |

FOREIGN PATENT DOCUMENTS

| | | |
|---|---|---|
| DE | 3707238 | 9/1988 |
| GB | 191201555 | 11/1912 |
| GB | 636338 | 4/1950 |
| JP | S52150366 | 12/1977 |
| JP | 2000-019296 | 1/2000 |
| JP | 2002-055198 | 2/2002 |
| JP | 2004-346898 | 12/2004 |
| JP | 2009-181694 | 8/2009 |
| JP | 2009-191852 | 8/2009 |
| JP | 2010-192177 | 9/2010 |
| JP | 2012-024746 | 2/2012 |
| JP | 2016-037888 | 3/2016 |
| WO | 2015-064195 | 5/2015 |

* cited by examiner

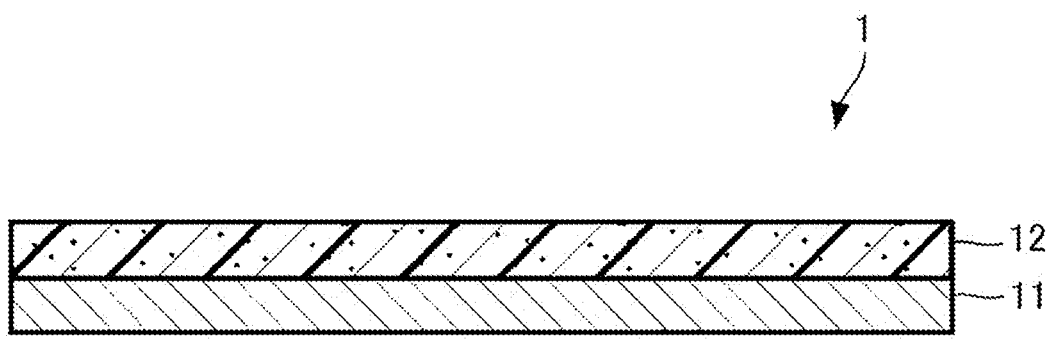

MEMBER FOR REDUCING CHARGE FOR TRANSPORTATION AND TRANSPORTATION PROVIDED WITH THE SAME BACKGROUND

(a) FIELD

The present invention relates to a member for reducing charge for transportation and transportation provided with the same.

(b) DESCRIPTION OF THE RELATED ART

When a vehicle such as a two-wheeled motor vehicle (motorcycle) and a four-wheeled motor vehicle (automobile) travel, static electricity is generated in the vehicle because of airflow contacting with the vehicle. Static electricity is also generated by repeatedly bringing each part of the tires to contact with or separate from a road surface on the rotation of the wheels or by relatively moving the components of the engine, the brake equipment, etc.

Since the tires have substantially electrically insulate a vehicle from the earth due to their low conductivity, the body, etc., of a vehicle takes charge (generally, positive charge) once static electricity is generated in the vehicle.

The body with positive charge decreases the engine performance. If the engine is a gasoline engine or a diesel engine, the body with positive charge causes inhibited operation of the piston, decreased combustion efficiency of the engine, or inhibited flow of the radiator water and the engine oil, for example. As the result, the driver experiences the decreased force sensitivity and torque sensitivity, the increased engine vibration, or the decreased fuel cost, for example.

Moreover, if a battery is used as the power source for a vehicle such as an electric vehicle, an electric bike, or an electric wheelchair, the friction is affected when the body has a positive charge. As the result, the driver experiences the increased electricity usage, consequently the decreased cruising range.

The body with positive charge also deteriorates the driving comfort. Even if the drive source is any one of a gasoline engine, a diesel engine, and a battery, the body with a positive charge limits the operation of the suspension, the gear, etc. As the result, the driver experiences the increased vibration of tires, etc., or the decreased driving stability.

Therefore, the technique for decreasing the charge taken by a vehicle has been researched, and various techniques have been proposed.

For example, Patent Document 1 discloses that a self-discharge type static eliminator that neutralizes and decreases positive potential of at least one of specific separating parts on which a positively charged air flowing to around the body when the vehicle is travelling begins to change from the flow along the surface of the charged body into the flow away from the surface by self-discharge generating a negative air ion for the positive potential is provided in a vehicle positively charged by static electricity caused by an external factor including travelling, in which a body maintaining the insulated condition from a road.

CITATION LIST

Patent Literature

Patent Document 1; WO 2015064195 A1 SUMMARY

However, there is room for improvement in decrease of positive charge of a charged vehicle.

The present invention has been achieved in view of these problems. The objective of the present invention is to provide a member for reducing charge for transportation that further decreases positive charge of charged transportation to contribute to improvement in driving stability and acceleration performance.

Since keenly examined to solve the above-mentioned problems, the inventors have found that the member has a specific layered-form to achieve the above-mentioned objective and achieved the present invention.

The present invention is a member for reducing charge for transportation, including;

a metal layer containing a metal with a redox potential of 0 V or less or an alloy of a metal with a redox potential of 0 V or less; and a radiation generating layer containing a mixture of a natural ore containing a radioactive substance with a radiolucent resin, the metal layer and the radiation generating layer being laminated, in which the dose of radiation generated from the radiation generating layer is from 0.02 µSv/h or more to 0.2 µSv/h or less.

The member for reducing charge for transportation of the present invention is preferably flexible.

The present invention is also transportation including the member for reducing charge for transportation in a specific part that belongs to the components forming a body, the specific part at which airflow begins to change from the flow along the surface of a body into the flow away from the surface.

In the transportation of the present invention, the member for reducing charge for transportation is preferably provided in the back side exposed to air flowing on the opposite side to the outer surface of the transportation.

According to the present invention, the radiation generating layer contains a natural ore containing a radioactive substance and generates radiation. This radiation ionizes a metal, etc., with a redox potential of 0V or less that forms the metal layer. The negative charge caused by this ionization decreases positive charge of a charged specific part of transportation.

The specific part is at least one of separating parts on which a positively charged air flowing to around the body when a vehicle is travelling begins to change from the flow along the surface of the charged body into the flow away from the surface, which improves the operation stability of transportation by preventing the air from flowing away.

This enables the repulsion (repulsive force) caused between the surface of a positively charged body and the positively charged airflow to decrease. Accordingly, a positively charged air can be prevented from flowing away from around the surface of the body. As the result, the air pressure that acts on the surface of the body can be prevented from changing more than expected, and the aerodynamic characteristics of the body can be prevented from deteriorating, and thus the travelling performance such as driving stability can be avoided from decreasing.

For example, the aerodynamic characteristics in the pitching direction of the body can be prevented from changing or decreasing by decreasing positive potential of the central part in the width direction of the body. Therefore, the load caused by transportation contacting to the ground, the water, etc., can be prevented from changing, and thus the acceleration performance and the driving stability can be prevented from decreasing.

Moreover, for example, the aerodynamic characteristics in the rolling or the yaw direction of the body can be prevented from changing or decreasing by decreasing positive potential of any pair of parts on the right and left of a central part in the width direction of the body. Therefore, the driving performance such as the driving stability can be prevented from decreasing.

Moreover, for example, the performance such as the driving stability can be further prevented from decreasing by decreasing positive potential of a plurality of parts located at constant intervals along the flow direction of air flowing around transportation when it moves.

Moreover, since the member for reducing charge for transportation is provided in the back side exposed to air flowing on the opposite side to the outer surface of the transportation, the appearance is not damaged.

The present invention can provide a member for reducing charge for transportation that further decreases positive charge of charged transportation to contribute to improvement in driving stability and acceleration performance.

BRIEF DESCRIPTION OF DRAWINGS

FIG. 1 shows a schematic pattern diagram of the member for reducing charge for transportation 1 according to an embodiment.

DESCRIPTION OF EMBODIMENTS

Embodiments of the present invention will be specifically described below. The present invention is not limited to the following embodiments and can be appropriately modified within the scope of the objective of the present invention and achieved.

Member for Reducing Charge

FIG. 1 shows a schematic pattern diagram of the member for reducing charge 1 according to an embodiment. The member for reducing charge 1 at least includes a metal layer 11 and a radiation generating layer 12.

The member for reducing charge 1 is preferably flexible. Since the member for reducing charge 1 is flexible, the member for reducing charge 1 can be closely attached to the curved surface.

Metal Layer 11

The metal layer 11 contains a metal with a redox potential of 0 V or less or an alloy of a metal with a redox potential of 0 V or less. The alloy has a redox potential of 0 V or less if contained. Since the metal layer 11 contains a specific material, the dose of radiation generated from the radiation generating layer 12 is from 0.02 µSv/h or more to 0.2 µSv/h or less, which is extremely low. However, the radiation generated from the radiation generating layer 12 can suitably ionize the metal, etc., contained in the metal layer 11. Thus, delivering the negative charge caused by the ionization to each part of transportation can suitably reduce the positive charge taken by transportation.

Examples of the metal with a redox potential of 0 V or less include lithium (−3.045 V), cesium (−2.923 V), rubidium (−2.924 V), potassium (−2.925 V), barium (−2.92 V), strontium (−2.89 V), calcium (−2.84 V), sodium (−2.714 V), magnesium (−2.356 V), thorium (−1.90 V), beryllium (−1.85 V), aluminum (−1.676 V), titanium (−1.63 V), zirconium (−1.534 V), manganese (−1.18 V), tantalum (−0.81 V), zinc (−0.7626 V), chrome (−0.74 V), iron (−0.44 V), cadmium (−0.4025 V), cobalt (−0.277 V), nickel (−0.257 V), tin (−0.1375 V), and lead (−0.1263 V).

In order to more suitably generate negative charge, the redox potential of the metal or the alloy contained in the metal layer 11 is preferably −0.4 V or less, more preferably −1.0 V or less, further more preferably −1.5 V or less, still further more preferably −2.0 V or less, particularly preferably −2.5 V or less.

In this embodiment, the metal layer 11 is preferably a plate or a foil. This reduces the surface area to make the metal or the alloy hard to spontaneously ignite, compared with the powder. Even if the metal or the alloy has a low redox potential, the metal layer 11 can be relatively handled.

On the other hand, a metal with a redox potential of more than 0 V cannot preferably generate negative charge unless the dose of radiation generated from the radiation generating layer 12 is increased to more than 0.2 µSv/h.

The minimum thickness of the metal layer 11 is not limited in particular as long as the ionized metal layer 11 suitably generates negative charge. The minimum thickness of the metal layer 11 is preferably 0.01 mm or more, more preferably 0.05 mm or more, further more preferably 0.1 mm or less.

The maximum thickness of the metal layer 11 is not limited in particular The maximum thickness of the metal layer 11 is preferably 10 mm or less, more preferably 5 mm or less, further more preferably 1 mm or more.

Radiation Generating Layer 12

The radiation generating layer 12 contains a natural ore containing a radioactive substance.

The natural ore is not limited in particular as long as the material contains a radioactive substance. Examples of the natural ore include monazite, radium ore, phosphate ore, columbite, tantalite, strueverite, pyrochlore, bastnasite, cerium concentrate, zircon, gummite, davidite, brannerite, uraninite (pitchblende), ningyoite, autunite, carnotite, tyuyamunite, meta-tyuyamunite, tyuyamunite ore, schroeckingerite, zirkelite, xenotime, hydrothorite, auerlite, maifan stone, allanite, tungsten ore, thorianite, brookite, uranophane, torbernite, coffinite, uranothorite, uranothorianite, thorite, and francevillite.

To more suitably ionize a metal, etc., contained in the metal layer 11, the minimum dose of radiation generated from the radiation generating layer 12 is 0.02 µSv/h or more, preferably 0.05 µSv/h or more, particularly preferably 0.1 µSv/h or more.

The maximum dose of radiation generated from the radiation generating layer 12 is preferably 0.2 µSv/h or less, more preferably 0.15 µSv/h or less, particularly preferably 0.1 µSv/h or less. Defining the maximum dose of radiation can much more improve the safety of the use of radiation.

Defining the maximum dose of radiation can also reduce mineral ores used as the radiation sources to lead to the efficient use and the cost reduction of the natural ores.

In this embodiment, the dose of radiation includes a back-ground when a NaI scintillation survey meter is used (a dose in the case where no natural ore is contained in the radiation generating layer 12).

The minimum content of a natural ore is not limited in particular as long as the natural ore can generate radiation enough to activate a substance to be activated that exists inside the device. The minimum content of a natural ore is preferably 0.01 parts by mass or more, more preferably 0.1 parts by mass or more, particularly preferably 1 part by mass or more based on 100 parts by mass of the material forming the radiation generating layer 12.

The maximum content of a natural ore is not limited in particular as long as the dose of radiation generated from the radiation generating layer 12 can be adjusted to 0.2 µSv/h or less. The maximum content of a natural ore is preferably 90 parts by mass or less, more preferably 85 parts by mass or less, particularly preferably 80 parts by mass or less based on 100 parts by mass of the material forming the radiation generating layer 12.

The minimum thickness of the radiation generating layer 12 is not limited in particular as long as the natural ore can generate radiation enough to activate a substance to be activated that exists inside the device. The minimum thickness of the radiation generating layer 12 is preferably 0.01 mm or more, more preferably 0.05 mm or more, particularly preferably 0.1 mm or more.

The maximum thickness of the radiation generating layer 12 is not limited in particular. The maximum thickness of the radiation generating layer 12 is preferably 10 mm or less, more preferably 5 mm or less, particularly preferably 1 mm or less.

The radiation generating layer 12 preferably contains a natural ore and a resin composition as a resin mixture.

The resin is not limited in particular. Examples of the resin include an acryl resin, a polycarbonate resin, a polyester resin, a polystyrene resin, a polyolefin resin, a vinyl chloride resin, a polyimide resin, a silicone resin, and copolymers of any combination selected from these resins. Among these, a polycarbonate resin, a polyester resin, and a silicone resin are preferable because these resins have excellent flexibility.

The radiation generating layer 12 may contain a widely used additive within a scope which does not affect the invention described in this embodiment. Examples of the additive include a viscosity modifier, a processing aid, a stabilizer, a fire retardant, a disaster prevention agent, an antioxidant, an antistat, an ultraviolet absorber, a filler, a colorant, and a foaming agent.

Although not required, the radiation generating layer 12 contains a powder of a metal with a redox potential of from −1.5 V or more to 0 V or less or a powder of an alloy of a metal with a redox potential of from −1.5 V or more to 0 V or less. The alloy preferably has a redox potential of from −1.5 V or more to 0 V or less. Since such a metal or an alloy powder is contained in the radiation generating layer 12, the radiation generated from the radiation generating layer 12 collides with the metal or the alloy powder to cause diffused reflection. When the radiation is delivered to the metal layer 11, the dose of radiation reflected by the metal layer 11 at a certain incidence angle and a certain reflection angle is increased. This can lead to increased activation of the substance.

As described below, to facilitate the handling of the metal or the alloy powder when the radiation generating layer 12 is prepared, the redox potential of the metal or the alloy powder contained in the radiation generating layer 12 is preferably −1.0 V or more, more preferably −0.75 V or more, further more preferably −0.5 V or more, particularly preferably −0.4 V or more.

To stimulate the diffused reflection of the radiation generated from the radiation generating layer 12, the particle size of the metal or the alloy powder contained in the radiation generating layer 12 is preferably as small as possible. However, the smaller the particle size is, the larger the surface area of the metal or the alloy is. To facilitate the handling of the metal or the alloy powder, the radiation generating layer 12 is preferred not to substantially contain a metal or an alloy powder with a redox potential of less than −1.5 V, more preferably less than −1.0 V, further more preferably less than −0.75 V, still further more preferably less than −0.5 V, particularly preferably less than −0.4 V.

In this embodiment, "not to substantially contain" means that the amount of the metal or the alloy powder has risks associated with the spontaneous ignition caused by the above-mentioned metal or alloy powder and the influence on the surrounding environment including the preparation device when the resin composition is prepared.

Possibly Repeated Structure

The member for reducing charge for transportation 1 may be a structure in which the metal layer 11 and the radiation generating layer 12 are repeatedly disposed. Specifically, the member for reducing charge for transportation 1 has a repeated structure in which the metal layer 11 and the radiation generating layer 12 are repeated twice or more, for example, the metal layer 11, the radiation generating layer 12, the metal layer 11, the radiation generating layer 12, the metal layer 11, the radiation generating layer 12, and on and on.

Transportation

The member for reducing charge for transportation 1 of this embodiment is suitably used for transportation positively charged by static electricity caused by an external factor including travelling, in which a body maintaining the insulated condition from the contact ground.

In this embodiment, the transportation means a comprehensive concept including all means for transporting a human or a load such as vehicles (encompassing all vehicles such as a car, a motorcycle, and a rail car), an aircraft, and a ship. The case where the transportation is a car will be explained below as one example. However, the transportation is not limited to a car.

The member for reducing charge for transportation 1 is attached to a specific part that belongs to components forming a body. At the specific part, airflow begins to change from the flow along the surface of a body into the flow away from the surface. In the attachment of the member for reducing charge for transportation 1, the metal layer 11 or the radiation generating layer 12 may contact with the surface of the body.

The radiation generating layer 12 contains a natural ore containing a radioactive substance and generates radiation. This radiation ionizes a metal, etc., with a redox potential of 0V or less that forms the metal layer 11. The negative charge caused by this ionization decreases positive charge of a charged specific part of transportation. The negative charge is caused by ionizing a metal, etc., forming the metal layer 11, which is not a negative air ion. Therefore, the decrease of positive charge by a negative charge in this embodiment does not mean neutralization and decrease of positive potential by self-discharge generating a negative air ion for the positive potential.

As described above, the radiation generating layer 12 preferably contains a natural ore and a resin composition as a resin mixture. Since the resin is non-conductivity, the negative charge caused by ionizing a metal, etc., forming the metal layer 11 is not discharged. This also supports that the decrease of positive charge by a negative charge in this embodiment does not mean neutralization and decrease of positive potential by self-discharge generating a negative air ion for the positive potential.

In this embodiment, the specific part means at least one of separating parts on which a positively charged air flowing to around the body when a vehicle is travelling begins to change from the flow along the surface of the charged body into the flow away from the surface, which improves the operation stability of transportation by suppressing the air flowing away.

This enables the repulsion (repulsive force) caused between the surface of a positively charged body and the positively charged airflow to decrease. Accordingly, a positively charged air can be prevented from flowing away from around the surface of the body. As the result, the air pressure that acts on the surface of the body can be prevented from changing more than expected, and the aerodynamic characteristics of the body can be prevented from deteriorating, and thus the travelling performance such as driving stability can be avoided from decreasing.

For example, the aerodynamic characteristics in the pitching direction of the body can be prevented from changing or decreasing by decreasing positive potential of the central part in the width direction of the body. Therefore, the load caused by transportation contacting to the ground can be prevented from changing, and thus the acceleration performance and the driving stability can be prevented from decreasing.

Moreover, for example, the aerodynamic characteristics in the rolling or the yaw direction of the body can be prevented from changing or decreasing by decreasing positive potential of any pair of parts on the right and left of a central part in the width direction of the body. Therefore, the driving performance such as the driving stability can be prevented from decreasing.

Moreover, for example, the driving performance such as the driving stability can be further prevented from decreasing by decreasing positive potential of a plurality of parts located at constant intervals along the flow direction of air flowing around the body when it moves.

"Air flows away" means that airflow along the surface of a body is changed into airflow away from the surface of the body. Air flows away mainly at the part at which the outer surface of the body bends to the inside when the body is seen from an anterior view. More specifically, air flows away from the parts bending on the right and left of the body so that the width of transportation is decreased, on the hood and the roof so that the height is decreased, and on the exposed bottom of the body, such as the undercover so that the height of transportation gradually decreases to change a constant as it goes backward or so that the height of transportation is a constant to change gradually increase as it goes backward. Additionally, a part partially projecting to the outside of the body or an uneven part is also included in the specific part at which air flows away.

The exterior components, etc., of transportation are easily positively charged by inner factors including airflow around the transportation and the outer periphery, etc. of the tire repeatedly contacting to and separating from the ground such as a road surface or by an external factor that a charge is acquired from the outside. Examples of the exterior parts include the bumper cover on the front of transportation, the door mirrors, the headlights, the doorknobs, the taillights, the antenna fin, the resinic side door, and the resinic back door. These exterior components easily positively charged by static electricity and thus are resinic parts that increase positive potential. The member for reducing charge for transportation 1 of this embodiment is effectively provided in the specific parts of these resinic exterior components.

The member for reducing charge for transportation 1 may be provided not only the inside toward the transportation of the exterior components but also the outside of the exterior components.

In the case where the transportation is a car as an example, examples of the outside of the exterior components include one or more selected from the outer surface of the coating of the body, the front end of the engine food, the back end of the engine food, the bottom end of the front window, the top end of the front window, the front end of the ceiling, the front side of the ceiling, the back side of the ceiling, the roof spoiler, the lower face of the engine food, the rear spoiler, the rear back door glass, the front edge of the bottom side of the front bumper, the rear fuel tank provided under the floor of the body, the lower side of the rear trunk under the floor of the body, the bottom end of the rear bumper, the front bumper, and the front fender.

The member for reducing charge for transportation 1 is preferably provided in the back side exposed to air flowing on the opposite side to the outer surface of the transportation. This prevents the appearance from being damaged after the member for reducing charge for transportation 1 is attached.

EXAMPLES

The present invention is specifically described below with reference to Examples but is not limited thereto.

Example and Comparative Examples

Example 1

The member for reducing charge for transportation 1 shown in FIG. 1 was formed on the lower inside of the outer four corners and the bumper of a car so that the metal layer 11 and the radiation generating layer 12 were laminated in this order from the surface of the car body. The size of the member for reducing charge for transportation 1 that contains this laminated structure is 50 mm in length, 250 mm in width, and 0.05 mm in thickness.

The car traveled on the expressway (Tomei expressway between Atsugi and Tokyo interchanges, one way trip of about 35 km) at 100 km/h. As the car for the test run, AXELA (model code: DBA-BM5FP, total emission: 1.49 L) from Mazda Motor Corporation was used. The fuel was unleaded regular gasoline.

Comparative Example 1

The aluminum foil tape was used instead of the member for reducing charge for transportation 1 used in Example 1. Otherwise, the test run was conducted by the same way as Example 1.

The aluminum foil tape was a genuine tape molding produced by Toyota Motor Corporation. The size was 50 mm in length and 250 mm in width.

Comparative Example 2

The test run was conducted by the same way as Example 1 except that the member for reducing charge for transportation was not used.

Evaluation

Fuel Cost

The car entered Tomei expressway from Atsugi interchange. The car increased its speed to 100 km/h after entered the expressway, and then the gas mileage meter was reset. Then, the car cruised about 25 km at 100 km/h when the value indicated by the gas mileage meter was recorded before the car slowed down. This was determined as a measurement from Atsugi to Tokyo.

Then, the car entered Tomei expressway from Tokyo interchange. The car increased its speed to 100 km/h after entered the expressway, and then the gas mileage meter was reset. Then, the car cruised about 25 km at 100 km/h when the value indicated by the gas mileage meter was recorded before the car slowed down. This was determined as a measurement from Tokyo to Atsugi.

Table 1 shows the results.

TABLE 1

|  | From Atsugi to Tokyo | | From Tokyo to Atsugi | |
|---|---|---|---|---|
|  | Fuel cost (km/L) | Improvement rate (%) | Fuel cost (km/L) | Improvement rate (%) |
| Example 1 | 20.3 | 7.4 | 21.2 | 3.9 |
| Comparative Example 1 | 19.1 | 1.1 | 20.0 | −2.0 |
| Comparative Example 2 | 18.9 | — | 20.1 | — |

It was confirmed that the use of the member for reducing charge for transportation 1 shown in FIG. 1 (Example 1) produced an effect to improve the fuel cost by 3% or more compared with no use of the member for reducing charge for transportation (Comparative Example 2). Furthermore, it was confirmed that even the aluminum foil tape that has a high evaluation known among the users (Comparative Example 1) produced an effect to improve the fuel cost by only about 1%.

Senses

Additionally, the senses while the car was travelling were evaluated. In Example 1 (the member for reducing charge for transportation 1 shown in FIG. 1), there was a sense of safety that is enough to hold the steering wheel lightly with hands when the car was travelling in a straight line. Moreover, the stability when the steering wheel was turned by a slight rudder angle in the high-speed cruise was high.

On the other hand, in Comparative Example 1 (aluminum foil tape) and Comparative Example 2 (no members for reducing charge for transportation), the steering wheel was held tight, and otherwise there were a sense of high speed and anxiety.

REFERENCE SIGNS LIST

1 Member for reducing charge for transportation
11 Metal layer
12 Radiation generating layer

The invention claimed is:

1. A member for reducing charge for transportation, comprising:
   a metal layer containing a metal with a redox potential of 0 V or less or an alloy of a metal with a redox potential of 0 V or less; and
   a radiation generating layer containing a mixture of a natural ore containing a radioactive substance with a radiolucent resin,
   the metal layer and the radiation generating layer being laminated, wherein
   the dose of radiation generated from the radiation generating layer is from 0.02 μSv/h or more to 0.2 μSv/h or less.

2. The member for reducing charge for transportation according to claim 1, wherein the member is flexible.

3. Transportation comprising the member for reducing charge for transportation according to claim 1 in a specific part that belongs to components forming a body, the specific part at which airflow begins to change from the flow along the surface of a body into the flow away from the surface.

4. Transportation according to claim 3, wherein the member for reducing charge for transportation is provided to a back side exposed to air flowing on the opposite side of an outer surface of the transportation.

\* \* \* \* \*